United States Patent [19]  [11] 3,898,260
Meyer et al.  [45] Aug. 5, 1975

[54] THIOPHOSPHORIC ACID AMIDE ESTERS

[75] Inventors: Willy Meyer, Basel; Beat Böhner, Binningen; Dag Dawes, Pratteln, all of Switzerland

[73] Assignee: Ciba-Geigy Corporation, Ardsley, N.Y.

[22] Filed: Sept. 6, 1973

[21] Appl. No.: 394,704

[30] Foreign Application Priority Data
Sept. 13, 1972   Switzerland.................. 13458/72
July 9, 1973     Switzerland.................. 9960/73

[52] U.S. Cl. ...... 260/455 P; 260/207.1; 260/327 M; 260/340.3; 260/938; 424/202; 424/211; 424/216
[51] Int. Cl..... C07c 155/08; C07f 9/24; A01n 9/36
[58] Field of Search .................. 260/938, 455 P

[56] References Cited
FOREIGN PATENTS OR APPLICATIONS
18,119   8/1961   Japan.................... 260/938

*Primary Examiner*—Anton H. Sutto
*Attorney, Agent, or Firm*—Frederick H. Rabin

[57] ABSTRACT

Thiophosphoric acid amide esters of the formula

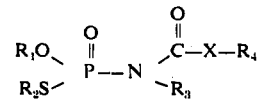

wherein:
$R_1$ represents $C_1$–$C_4$-alkyl,
$R_2$ represents $C_1$–$C_7$-alkyl, $C_3$–$C_5$-alkenyl, $C_3$–$C_5$-alkynyl or unsubstituted oro substituted benzyl,
$R_3$ represents $C_1$–$C_6$-alkyl, allyl or $C_3$–$C_6$-cycloalkyl,
$R_4$ represents alkenyl, alkynyl, unsubstituted or substituted benzyl, phenethyl, phenyl or naphthyl, and
X represents oxygen or sulphur,
processes for their manufacture and their use in pest control.

10 Claims, No Drawings

THIOPHOSPHORIC ACID AMIDE ESTERS

The present invention relates to thiophosphoric acid amide esters, to processes for their preparation and to their use in pest control.

The thiophosphoric acid amide esters have the formula

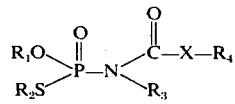

wherein:
- $R_1$ represents $C_1$–$C_4$-alkyl,
- $R_2$ represents $C_1$–$C_7$-alkyl, $C_3$–$C_5$-alkenyl, $C_3$–$C_5$-alkynyl or unsubstituted or substituted benzyl,
- $R_3$ represents $C_1$–$C_6$-alkyl, allyl or $C_3$–$C_6$-cycloalkyl,
- $R_4$ represents alkenyl, alkynyl, unsubstituted or substituted benzyl, phenethyl, phenyl or naphthyl, and
- X represents oxygen or sulphur.

The alkyl, alkenyl and alkynyl groups denoted by $R_1$ to $R_4$ can be straight-chain or branched, unsubstituted or substituted, e.g. by halogen such as fluorine, chlorine, bromine and/or iodine, alkoxy, or alkylthio. The alkenyl and alkynyl groups in the case of $R_4$ have chains containing 3–10, preferably 3–5, carbon atoms.

Examples of such groups are: methyl, methoxymethyl, methylthiomethyl, ethyl, chloroethyl, propyl, isopropyl, n-, i-, sec.-, tert.-butyl, n-pentyl, n-hexyl, n-heptyl and their isomers, vinyl, allyl, 2-methallyl, propargyl and iso-butinyl. Where $R_3$ denotes cycloalkyl, this is preferably cyclopropyl.

Preferred substituents on the benzyl, phenethyl, phenyl and naphthyl groups include halogen, preferably fluorine, chlorine and/or bromine, $C_1$–$C_4$-alkyl, $C_1$–$C_4$-haloalkyl, particularly —$CF_3$, $C_1$–$C_4$-alkoxy, $C_1$–$C_4$-alkylthio, $C_1$–$C_2$-alkylsulphinyl, $C_1$–$C_2$-alkylsulphonyl, $C_1$–$C_4$-alkoxycarbonyl, $C_3$–$C_4$-alkenyloxy, $C_3$–$C_4$-alkynyloxy, cyano, alkenyl, acetyl, —O—$CH_2$—$CH_2$—O—,

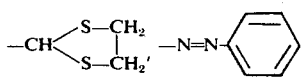

and/or nitro.

Compounds of formula I preferred because of their effectiveness are compounds wherein
- $R_1$ represents methyl or ethyl,
- $R_2$ represents $C_1$–$C_5$-alkyl, allyl, propargyl or benzyl,
- $R_3$ represents $C_1$–$C_3$-alkyl or allyl,
- $R_4$ represents $C_3$–$C_5$-alkenyl, $C_3$–$C_5$-alkynyl, benzyl or naphthyl, or phenyl unsubstituted, or mono- or polysubstituted by methyl, alkoxy, methylthio, methylsulphinyl, methylsulphonyl, trifluoromethyl, fluorine, chlorine, bromine, ethyl, propyl, isopropyl, sec.-butyl, $C_3$–$C_5$-alkenyl, nitro, propargyloxy, $C_1$–$C_4$-alkoxycarbonyl,

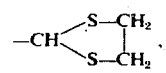

phenylazo, cyano, sulphonamido, acetyl, or —O—$CH_2$—$CH_2$—O—, and represents oxygen or sulphur.

Particularly preferred compounds of formula I are those wherein
- $R_1$ represents methyl or ethyl,
- $R_2$ represents propyl, isopropyl, n-butyl, sec.-butyl, iso-butyl, n-pentyl, propargyl, allyl or benzyl,
- $R_3$ represents methyl, propyl or allyl,
- $R_4$ represents allyl, propargyl, benzyl or naphthyl, or phenyl unsubstituted, or mono- or poly-substituted by methyl, methoxy, methylthio, methylsulphinyl, methylsulphonyl, trifluoromethyl, fluorine, chlorine, bromine, ethyl, propyl, isopropyl, sec.-butyl, nitro, propargyloxy, $C_3$–$C_5$-alkenyl, $C_1$–$C_4$-alkoxycarbonyl,

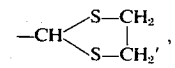

phenylazo, cyano, sulphonamido, acetyl or —O—$CH_2$—$CH_2$—O—, and
X represents oxygen or sulphur.

Compounds of formula I more especially preferred, however, are compounds wherein
- $R_1$ represents ethyl,
- $R_2$ represents n-propyl, sec.-butyl, n-butyl, allyl, propargyl or benzyl,
- $R_3$ represents methyl or allyl,
- $R_4$ represents allyl, propargyl, or phenyl unsubstituted, or mono- or poly-substituted by methyl, methoxy, methylthio, methylsulphinyl, methylsulphonyl, trifluoromethyl, fluorine, chlorine, bromine, ethyl, propyl, isopropyl, sec.-butyl, nitro, propargyloxy, allyl, methoxycarbonyl,

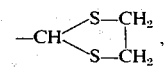

phenylazo, cyano, sulphonamido or acetyl, and
X represents oxygen or sulphur.

The compounds of formula I can be prepared by methods known per se, e.g. as follows:

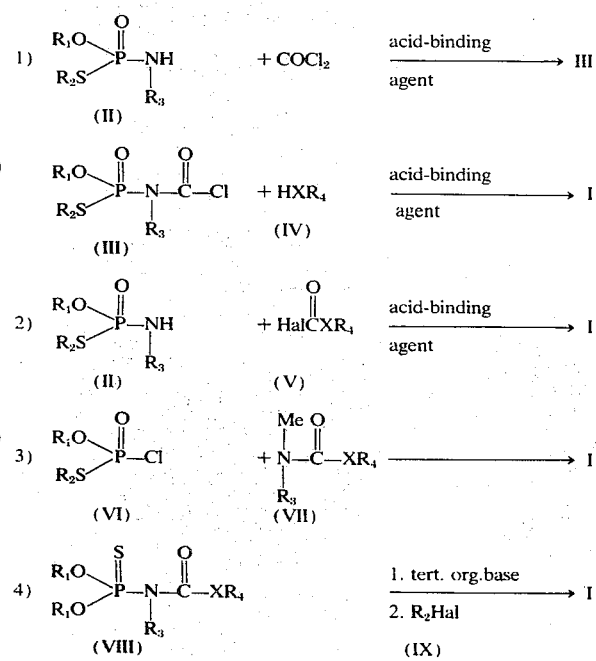

In the formulae II to IX, $R_1$ to $R_4$ and X have the meanings given for formula I, Me stands for an alkali metal, particularly lithium, sodium or potassium, and Hal for fluorine, chlorine, bromine or iodine.

Suitable acid-binding agents are: tertiary amines, e.g. trialkylamines, pyridine, dialkylanilines; inorganic bases, such as hydrides, hydroxides; and carbonates and bicarbonates of alkali metals and alkaline-earth metals. The processes are performed at a reaction temperature of −20° to 150°C, under normal pressure and in solvents or diluents. Suitable solvents or diluents are, e.g. ethers and ethereal compounds, such as diethyl ether, dipropyl ether, dioxane, dimethoxyethane or tetrahydrofuran; amides such as N,N-dialkylated carboxylic acid amides; aliphatic, aromatic as well as halogenated hydrocarbons, particularly benzene, toluene, xylenes, chloroform or chlorobenzene; nitriles such as acetonitrile; DMSO, ketones such as acetone, methyl ethyl ketone and water.

The starting materials of formula II are in some cases known, or can be prepared by methods analogous, for exxample, to those described in the British Patent Specification No. 1,275,330. The active substances of formula I are suitable for the control of various animal and plant pests.

The said active substances possess nematocidal properties, and can be employed, for example, for the control of phytopathogenic nematodes. In some cases the active substances of formula I are suitable also as herbicides and plant regulating agents, as well as for the control of members of the division thallophyta, such as, e.g. of viruses, bacteria and of phytopathogenic fungi. They are effective in particular, however, against all development stages, such as eggs, larvae, nymphs, pupae, and adults of insects and members of the order acarina, such as mites and ticks.

The compounds of formula I can be used, for example, against the following insects or members of the order acarina:- insects of the families: Tettigonidae, Gryllidae, Gryllotalpidae, Blattidae, Reduviidae, Phyrrhocoridae, Cimicidae, Delphacidae, Aphididae, Diaspididae, Pseudococidae, Scarabaeidae, Dermestidae, Coccinellidae, Tenebrionidae, Chrysomelidae, Bruchidae, Tineidae, Noctuidae, Lymatriidae, Pyralidae, Gulicidae, Tipulidae, Stomoxydae, Trypetidae, Muscidae, Calliphoridae and Pulicidae; also acarids of the families: Ixodidae, Argasidae, Tetranychidae and Dermanyssidae. The insecticidal and/or acaricidal action can be substantially broadened and adapted to suit the given circumstances by the addition of other insecticides and/or acaricides. Suitable additives are, for example: organic phosphorus compounds; nitrophenols and their derivatives; formamidines; ureas; carbamates and chlorinated hydrocarbons.

The compounds of formula I can be used on their own or together with suitable carriers and/or additives. Suitable carriers and additives may be solid or liquid and they correspond to the substances common in formulation practice, such as, e.g. natural and regenerated substances, solvents, dispersing agents, wetting agents, adhesives, thickeners, binders and/or fertilisers.

For application, the compounds of formula I can be processed into the form of dusts, emulsion concentrates, granulates, dispersions, sprays or solutions, the formulation of these preparations being effected in a manner commonly known in practice. Also to be mentioned are cattle dips and spray races, in which aqueous preparations are used.

The agents according to the invention are prepared in a manner known per se by the intimate mixing and/or grinding of active substances of formula I with suitable carriers, optionally with the addition of dispersing agents or solvents which are inert to the active substances. The active substances can be obtained and used in the following forms:

solid preparations: dusts, scattering agents, granulates, coated granulates, impregnated granulates and homogeneous granulates;
liquid preparations:
 a. water dispersible active-substance concentrates: wettable powders, pastes and emulsions;
 b. solutions.

The active substances of formula I can be formulated, for example, as follows:

Dusts

The following substances are used for the preparation of (a) a 5% dust, and (b) a 2% dust:

(a)

5 parts of active substance,
95 parts of talcum;

(b)

2 parts of active substance,
1 part of highly dispersed silicic acid,
97 parts of talcum.

The active substances are mixed and ground with the carriers.

Granulate:

The following substances are used to produce a 5% granulate:

5 parts of active substance,
0.25 parts of epichlorohydrin,
0.25 parts of cetyl polyglycol ether,
3.50 parts of polyethylene glycol,
91 parts of kaolin ( particle size 0.3 – 0.8 mm).

The active substance is mixed with epichlorohydrin and dissolved with 6 parts of acetone; the polyethylene glycol and cetyl polyglycol ether are then added. The solution thus obtained is sprayed on kaolin, and the acetone subsequently evaporated off in vacuo.

Wettable powder:

The following constituents are used for the preparation of (a) a 40%, (b) and (c) a 25%, and (d) a 10% wettable powder:

(a)

40 parts of active substance,
5 parts of sodium lignin sulphonate,
1 part of sodium dibutyl-naphthalene sulphonate,
54 parts of silicic acid.

(b)

25 parts of active substance,
4.5 parts of calcium lignin sulphonate
1.9 parts of Champagne chalk/hydroxyethyl cellulose mixture (1:1),
1.5 parts of sodium dibutyl naphthalene sulphonate,
19.5 parts of silicic acid,
19.5 parts of Champagne chalk,
28.1 parts of kaolin.

(c)

25 parts of active substance,
2.5 parts of isooctylphenoxy-polyoxyethylene-ethanol,
1.7 parts of Champagne chalk/hydroxyethyl cellulose mixture (1:1),
8.3 parts of sodium aluminium silicate,
16.5 parts of kieselguhr,
46 parts of kaolin.

(d)

10 parts of active substance,
3 parts of a mixture of the sodium salts of saturated fatty alcohol sulphates,
5 parts of naphthalenesulphonic acid/formaldehyde condensate,
82 parts of kaolin.

The active substances are intimately mixed, in suitable mixers, with the additives, the mixture being then ground in the appropriate mills and rollers. Wettable powders are pbtained which can be diluted with water to give suspensions of any desired concentration.

Emulsifiable concentrates

The following substances are used to produce (a) a 10% and (b) a 25% emulsifiable concentrate:

(a)

10 parts of active substance,
3.4 parts of epoxidised vegetable oil,
13.4 parts of a combination emulsifier consisting of fatty alcohol polyglycol ether and alkylarylsulphonate calcium salt,
40 parts of dimethylformamide,
43.2 parts of xylene.

(b)

25 parts of active substance,
2.5 parts of epoxidised vegetable oil,
10 parts of an alkylarylsulphonate/fatty alcoholpolyglycol ether mixture
5 parts of dimethylformamide,
57.5 parts of xylene.

From these concentrates it is possible to produce, by dilution with water, emulsions of any desired concentration.

Spray

The following constitutents are used to prepare a 5% spray:

5 parts of active substance,
1 part of epichlorhydrin,
94 parts of ligroin (boiling limits 160°–190°C).

EXAMPLE 1

Preparation of phenyl-N-(propylthioethoxy-phosphoryl)-N-methylcarbamate a. A mixture of 19.7 g of propylthio-ethoxyphosphoric acid-N-methylamide and 9.5 g of pyridine is added dropwise at 0°C to 11 g of phosgene in 100 ml of CCl$_4$. The suspension is stirred for a further 15 hours at room temperature, then filtered and fully concentrated by evaporation.

The compound obtained is of the formula

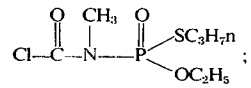

b. 25 g of N-(propylthio-ethoxyphosphoryl)-N-methylcarbamoyl chloride in 30 ml of abs. acetone is added dropwise at room temperature to a suspension of 9.4 g of phenol and 11.7 g of K$_2$CO$_3$ in 100 ml of abs. acetone. The suspension is stirred for 10 hours at 40°C, then cooled and filtered. The filtrate, concentrated by evaporation, is purified by chromatography through silica gel.

The compound of the formula

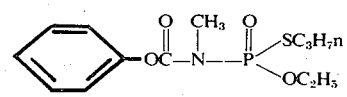

is obtained as a pale yellow liquid having a refractive index of $n_D^{23°} = 1.5207$.

EXAMPLE 2

Preparation of phenyl-N-(propargylthioethoxy-phosphoryl)-N-methylcarbamate

A solution of 30.2 g of N-methyl-N-(O.O-diethylthiophosphoryl)-phenylcarbamate and 11.2 g of triethylenediamine in 100 ml of toluene is stirred overnight at 60°C. An addition is made dropwise at ca. 40°C (exothermic) of 8.2 g of propargyl chloride, and stirring subsequently continued overnight at 60°C. The solution is diluted with 100 ml of petroleum ether and cleared by filtration.

The filtrate, concentrated by evaporation, is purified by chromatography through silica gel.

The compound of the formula

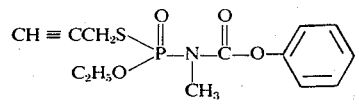

is obtained as a pale yellow liquid having a refractive index of $n_D^{20°} = 1.538$.

The following compounds are prepared in an analogous manner:

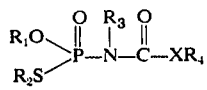

| $R_1$ | $R_2$ | $R_3$ | $R_4$ | X | Physical data |
|---|---|---|---|---|---|
| $C_2H_5$ | n $C_3H_7$ | $CH_3$ | phenyl-CH(S-CH₂-CH₂-S) (1,3-dithiolane) | O | $n_D^{23°} = 1.5722$ |
| $C_2H_5$ | n $C_3H_7$ | $CH_3$ | 2-Cl-phenyl | O | $n_D^{21°} = 1.5280$ |
| $C_2H_5$ | n $C_3H_7$ | $CH_3$ | 4-$O_2$N-phenyl | O | $n_D^{24°} = 1.5415$ |
| $C_2H_5$ | n $C_3H_7$ | $CH_3$ | 2-($CO-OCH_3$)-phenyl | O | $n_D^{24°} = 1.54192$ |
| $C_2H_5$ | n $C_3H_7$ | $CH_3$ | 2,5-diisopropyl-4-Cl-3-methyl-phenyl | O | $n_D^{24°} = 1.5212$ |
| $C_2H_5$ | n $C_3H_7$ | $CH_3$ | 2,5-diisopropyl-4-methyl-phenyl | O | $n_D^{24°} = 1.5140$ |
| $C_2H_5$ | n $C_3H_7$ | $CH_3$ | phenyl | S | $n_D^{24°} = 1.5613$ |
| $C_2H_5$ | $CH_3$ | $CH_3$ | phenyl-CH(S-CH₂-CH₂-S) | O | $n_D^{24°} = 1.5770$ |
| $C_2H_5$ | $CH_3$ | $CH_3$ | 2-isopropyl-phenyl | O | $n_D^{24°} = 1.5200$ |
| $C_2H_5$ | n $C_3H_7$ | $CH_3$ | naphthyl | O | $n_D^{21°} = 1.5682$ |
| $C_2H_5$ | n $C_3H_7$ | $CH_3$ | $-CH_2-CH=CH_2$ | O | $n_D^{24°} = 1.483$ |
| $C_2H_5$ | n $C_3H_7$ | $CH_3$ | $-CH_2-C\equiv CH$ | O | $n_D^{24°} = 1.4885$ |
| $C_2H_5$ | n $C_3H_7$ | $CH_3$ | phenyl-$CH_2-$ | O | $n_D^{21°} = 1.5189$ |
| $C_2H_5$ | (n)$C_3H_7$ | $CH_3$ | 3-$CH_3$-4-$SCH_3$-phenyl | O | $n_D^{21°} = 1.5482$ |

—Continued
| R₁ | R₂ | R₃ | R₄ | X | Physical data |
|---|---|---|---|---|---|
| $C_2H_5$ | $(n)C_3H_7$ | $CH_3$ | 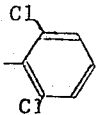 | O | $n_D^{20} = 1.5345$ |
| $C_2H_5$ | $(n)C_3H_7$ | $CH_3$ | 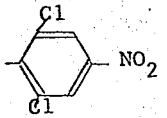 | O | $n_D^{23} = 1.552$ |
| $C_2H_5$ | $(n)C_3H_7$ | $CH_3$ | 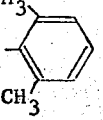 | O | $n_D^{22} = 1.5149$ |
| $C_2H_5$ | $(n)C_3H_7$ | $CH_3$ | 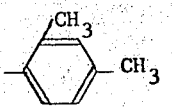 | O | $n_D^{22} = 1.5170$ |
| $C_2H_5$ | $(n)C_3H_7$ | $CH_3$ | 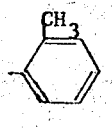 | O | $n_D^{22} = 1.5170$ |
| $C_2H_5$ | $(n)C_3H_7$ | $CH_3$ | 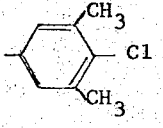 | O | $n_D^{22} = 1.5284$ |
| $C_2H_5$ | $(n)C_3H_7$ | $CH_3$ | 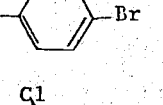 | O | $n_D^{23} = 1.5396$ |
| $C_2H_5$ | $(n)C_3H_7$ | $CH_3$ | 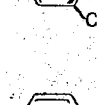 |   | $n_D^{23} = 1.5335$ |
| $C_2H_5$ | $(n)C_3H_7$ | $CH_3$ | 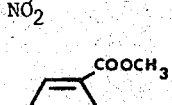 | O | $n_D^{23} = 1.5330$ |
| $C_2H_5$ | $(n)C_3H_7$ | $CH_3$ | 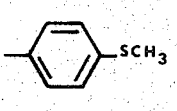 | O | $n_D^{20} = 1.5216$ |
| $C_2H_5$ | $(n)C_3H_7$ | $CH_3$ |  | O | $n_D^{20} = 1.5478$ |

—Continued

| R₁ | R₂ | R₃ | R₄ | X | Physical data |
|---|---|---|---|---|---|
| $C_2H_5$ | (n)$C_3H_7$ | $CH_3$ | 4-(C(CH₃)₃)-3-Cl-C₆H₃ | O | $n_D^{20} = 1.5211$ |
| $C_2H_5$ | (n)$C_3H_7$ | $CH_3$ | 4-CN-C₆H₄ | O | $n_D^{20} = 1.5306$ |
| $C_2H_5$ | (n)$C_3H_7$ | $CH_3$ | 4-SO₂N(CH₃)₂-C₆H₄ | O | $n_D^{20} = 1.5300$ |
| $C_2H_5$ | (n)$C_3H_7$ | $CH_3$ | C₆H₅-N=N-C₆H₄- | O | $n_D^{20} = 1.599$ |
| $C_2H_5$ | (n)$C_3H_7$ | $CH_3$ | 2-(O=C-CH₃)-C₆H₄ | | $n_D^{20} = 1.5250$ |
| $C_2H_5$ | $CH_2=CH-CH_2-$ | $CH_3$ | 2,3,5-Cl₃-C₆H₂ | O | $n_D^{23} = 1.5478$ |
| $C_2H_5$ | $CH_2=CH-CH_2-$ | $CH_3$ | 3-(CH(S-CH₂-S))-C₆H₄ | O | $n_D^{23} = 1.5749$ |
| $C_2H_5$ | $CH_2=CH-CH_2-$ | $CH_3$ | C₆H₅ | O | $n_D^{23} = 1.5258$ |
| $C_2H_5$ | $CH_2=CH-CH_2-$ | $CH_3$ | 2-Cl-C₆H₄ | O | $n_D^{23} = 1.5342$ |
| $C_2H_5$ | $CH_2=CH-CH_2-$ | $CH_3$ | 4-Cl-C₆H₄ | S | $n_D^{23} = 1.5712$ |
| $C_2H_5$ | $CH_3$ | $CH_3$ | 3-(CH(S-CH₂-S))-C₆H₄ | O | $n_D^{24} = 1.577$ |
| $C_2H_5$ | $CH_3$ | $CH_3$ | 2-(i-C₃H₇)-C₆H₄ | O | $n_D^{24} = 1.5200$ |
| $C_2H_5$ | $CH_2=CH-CH_2-$ | $CH_3$ | 4-CF₃-C₆H₄ | O | $n_D^{20} = 1.4961$ |

—Continued

| $R_1$ | $R_2$ | $R_3$ | $R_4$ | X | Physical data |
|---|---|---|---|---|---|
| '' | '' | '' | 4-methoxyphenyl | O | $n_D^{20} = 1.5348$ |
| '' | '' | '' | 4-nitrophenyl | O | $n_D^{20} = 1.5479$ |
| '' | '' | '' | 2,6-dichlorophenyl | O | $n_D^{20} = 1.5448$ |
| '' | '' | '' | 2-methyl-6-(methylthio)phenyl | O | $n_D^{20} = 1.5586$ |
| '' | '' | '' | 4-chlorophenyl | O | $n_D^{20} = 1.5402$ |
| $C_2H_5$ | $-CH(CH_3)_2$ | $CH_3$ | phenyl | O | $n_D^{23} = 1.5145$ |
| $C_2H_5$ | $-CH(CH_3)_2$ | $CH_3$ | phenyl | S | $n_D^{23} = 1.552$ |
| $C_2H_5$ | $(i)C_3H_7$ | $CH_3$ | 1,3-dithiolan-2-ylphenyl | O | $n_D^{23} = 1.570$ |
| $C_2H_5$ | $(n)C_3H_7$ | $CH_3$ | 2-(sec-butyl)-4,6-dinitrophenyl | O | $n_D^{23} = 1.5403$ |
| '' | '' | '' | 2,4-dinitrophenyl | O | $n_D^{23} = 1.5450$ |
| '' | '' | '' | 2,4,5-trichlorophenyl | O | $n_D^{23} = 1.5448$ |
| '' | '' | '' | 2-chlorophenyl | O | $n_D^{23} = 1.5274$ |
| '' | '' | '' | 2-nitrophenyl | O | $n_D^{23} = 1.5332$ |
| '' | '' | '' | 2-(trifluoromethyl)phenyl | O | $n_D^{20} = 1.4864$ |

—Continued
| $R_1$ | $R_2$ | $R_3$ | $R_4$ | X | Physical data |
|---|---|---|---|---|---|
| $C_2H_5$ | (n)$C_3H_7$ | $CH_3$ | 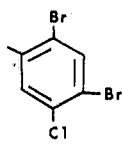 | O | $n_D^{20} = 1.5568$ |
| " | " | " | 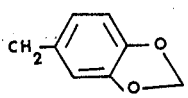 | O | $n_D^{20} = 1.5247$ |
| " | " | " | 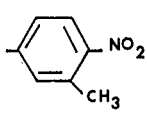 | O | $n_D^{20} = 1.5377$ |
| " | " | " | 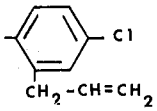 | O | $n_D^{20} = 1.5298$ |
| " | $CH_2=CH-CH_2$ | " | 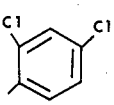 | O | $n_D^{20} = 1.5460$ |
| " | " | " | 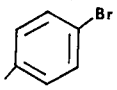 | O | $n_D^{20} = 1.5514$ |
| " | " | " | 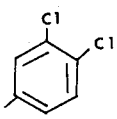 | O | $n_D^{20} = 1.5492$ |
| " | " | " | 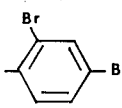 | O | $n_D^{20} = 1.5658$ |
| $C_2H_5$ | (n)$C_3H_7$ | $CH_2=CH-CH_2$ | 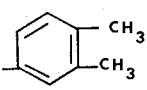 | O | $n_D^{20} = 1.550$ |
| " | " | " |  | O | $n_D^{20} = 1.5235$ |
| " | " | " | 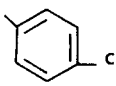 | O | $n_D^{20} = 1.5325$ |
| " | " | " | 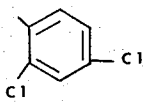 | O | $n_D^{20} = 1.5375$ |
| $C_2H_5$ | (n)$C_5H_{11}$ | $CH_3$ |  | O | $n_D^{20} = 1.5148$ |
| $C_2H_5$ | 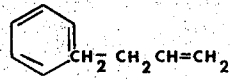 | |  | O | $n_D^{22} = 1.5565$ |

—Continued
| $R_1$ | $R_2$ | $R_3$ | $R_4$ | X | Physical data |
|---|---|---|---|---|---|
| '' | '' | '' |  | S | $n_D^{21} = 1.5868$ |
| '' | '' | '' | 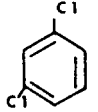 | O | $n_D^{22} = 1.5711$ |
| '' | '' | '' | —CH$_2$—C≡CH | O | $n_D^{23} = 1.5350$ |
| '' | '' | '' | 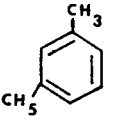 | O | |
| $C_2H_5$ | 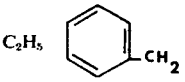 | —CH$_2$CH=CH$_2$ | 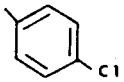 | O | |
| '' | '' | '' | 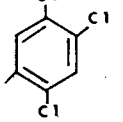 | O | |
| '' | '' | '' | 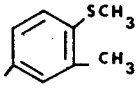 | O | $n_D^{23} = 1.5744$ |
| '' | '' | '' | 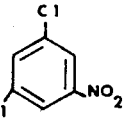 | O | |
| $C_2H_5$ | CH≡C—CH$_2$— | CH$_3$ |  | O | |
| '' | '' | '' | —CH$_2$—C≡CH | O | |
| '' | '' | '' | 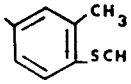 | O | |
| '' | '' | '' |  | S | |
| '' | '' | '' | 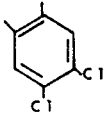 | O | |
| $C_2H_5$ | CH≡C—CH$_2$— | CH$_3$ | 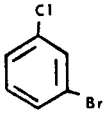 | O | |

—Continued

| R₁ | R₂ | R₃ | R₄ | X | Physical data |
|---|---|---|---|---|---|
| '' | '' | '' | C₆H₄-CN | O | |
| '' | '' | '' | C₆H₄-CH₃ | O | |
| '' | '' | CH₂=CH—CH₂ | C₆H₅ | O | |
| '' | '' | '' | —CH₂—CH=CH₂ | O | |
| '' | '' | '' | C₆H₄-NO₂ | O | |
| '' | sec(C₄H₉) | CH₃ | C₆H₅ | O | $n_D^{24}=1.5113$ |
| '' | '' | '' | C₆H₄-NO₂ | O | $n_D^{23}=1.5281$ |
| '' | '' | '' | C₆H₄-Cl | O | $n_D^{21}=1.5290$ |
| C₂H₅ | sec(C₄H₉) | CH₃ | C₆H₅ | S | $n_D^{21}=1.5420$ |
| '' | '' | '' | —CH₂C≡CH | O | |
| '' | '' | '' | C₆H₂Cl₃ | O | |
| '' | '' | '' | C₆H₄-Cl (o) | O | |
| '' | '' | '' | C₆H₄-CH₃ (o) | O | |
| C₂H₅ | (n)C₄H₉ | CH₃ | C₆H₅ | O | $n_D^{24}=1.5164$ |
| '' | '' | '' | C₆H₄-Cl (o) | S | |

-Continued
| $R_1$ | $R_2$ | $R_3$ | $R_4$ | X | Physical data |
|---|---|---|---|---|---|
| " | " | " | 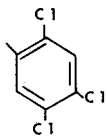 | O | |
| " | " | " | 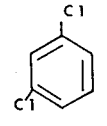 | O | $n_D^{21} = 1.5312$ |
| $C_2H_5$ | (n)$C_4H_9$ | $CH_3$ | 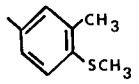 | O | $n_D^{24} = 1.5430$ |
| $C_2H_5$ | (n)$C_4H_9$ | $CH_3$ | 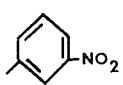 | O | |
| $C_2H_5$ | (n)$C_4H_9$ | $CH_3$ |  | O | $n_D^{24} = 1.5415$ |
| $C_2H_5$ | (n)$C_4H_9$ | $CH_3$ | 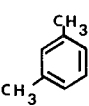 | O | $n_D^{22} = 1.5121$ |
| $C_2H_5$ | 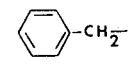 | $CH_3$ |  | O | $n_D^{24} = 1.5599$ |
| $C_2H_5$ | 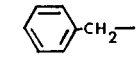 | $CH_3$ |  | O | $n_D^{21} = 1.5670$ |
| $C_2H_5$ | 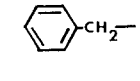 | $CH_3$ |  | S | |
| $C_2H_5$ | 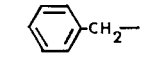 | $CH_3$ | 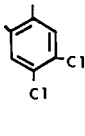 | O | |
| $C_2H_5$ | 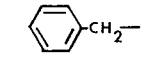 | $CH_3$ |  | O | |
| $C_2H_5$ | 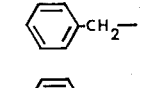 | $CH_3$ |  | O | |
| $C_2H_5$ | 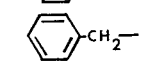 | $CH_3$ | $CH_2-CH=CH_2$ | O | |
| $C_2H_5$ | 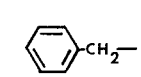 | $CH_3$ | $CH_2-C\equiv CH$ | O | $n_D^{21} = 1.5390$ |
| $C_2H_5$ |  | $CH_3$ |  | O | |

—Continued

| $R_1$ | $R_2$ | $R_3$ | $R_4$ | X | Physical data |
|---|---|---|---|---|---|
| $C_2H_5$ | C₆H₅-CH₂- | $CH_3$ | 2-CH₃, 1-SCH₃ phenyl | O | |
| $C_2H_5$ | C₆H₅-CH₂- | $CH_3$ | 3-CF₃ phenyl | O | |
| $C_2H_5$ | C₆H₅-CH₂- | $CH_3$ | 3,5-di-Cl, 4-NO₂ phenyl | O | $n_D^{23} = 1.5035$ |
| $CH_3$ | $C_3H_7$ | $CH_3$ | phenyl | O | |
| $CH_3$ | $C_3H_7$ | $CH_3$ | phenyl | S | |
| $CH_3$ | $C_3H_7$ | $CH_3$ | 2,3-di-Cl phenyl | O | $n_D^{24} = 1.5360$ |
| $CH_3$ | $C_3H_7$ | $CH_3$ | 4-Cl phenyl | O | $n_D^{24} = 1.5330$ |
| $CH_3$ | $C_3H_7$ | $CH_3$ | 2-Cl phenyl | O | |
| $CH_3$ | $C_3H_7$ | $CH_3$ | 2-CH₃ phenyl | O | |
| $CH_3$ | $C_3H_7$ | $CH_3$ | $-CH_2-C \equiv CH$ | O | |
| $CH_3$ | $C_3H_7$ | $CH_3$ | $-CH_2-CH=CH_2$ | O | |
| $CH_3$ | $C_3H_7$ | $CH_3$ | 2-(1,3-dithiolan-2-yl) phenyl | O | |
| $CH_3$ | $C_3H_7$ | $CH_3$ | 2-COCH₃ phenyl | O | |
| $CH_3$ | $C_3H_7$ | $CH_3$ | 2-CH₃, 1-SCH₃ phenyl | O | $n_D^{24} = 1.5510$ |
| $CH_3$ | $C_3H_7$ | $CH_3$ | 2-Cl, 4-Br phenyl | O | |
| $CH_3$ | $C_3H_7$ | $CH_3$ | 2-CF₃ phenyl | O | |
| $CH_3$ | $CH_2=CH-CH_2$ | $CH_3$ | phenyl | O | |
| $CH_3$ | $CH_2=CH-CH_2$ | $CH_3$ | 3,5-di-Cl phenyl | O | |
| $CH_3$ | $CH_2=CH-CH_2$ | $CH_3$ | $-CH_2-C \equiv CH$ | O | |

—Continued

| R₁ | R₂ | R₃ | R₄ | X Physical data |
|---|---|---|---|---|
| CH₃ | CH₂=CH—CH₂— | CH₃ |  | S |
| CH₃ | CH₂=CH—CH₂— | CH₃ | 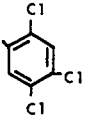 | O |
| CH₃ | CH≡C—CH₂— | CH₃ |  | O |
| CH₃ | CH≡C—CH₂— | CH₃ | 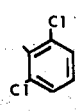 | O |
| CH₃ | CH≡C—CH₂— | CH₃ | —CH₂—CH=CH₂ | O |
| CH₃ | CH≡C—CH₂— | CH₃ |  | S |
| CH₃ | 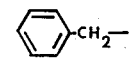 | CH₃ |  | O |
| CH₃ | 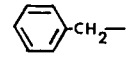 | CH₃ | HC≡C—CH₂— | O |
| CH₃ | 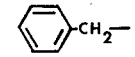 | CH₃ |  | O |
| CH₃ | C₃H₇S | CH₂=CH—CH₂— |  | O |

EXAMPLE 3

A. Insecticidal stomach poison action

Cotton and potato plants were sprayed with a 0.05% aqueous active-substance emulsion (obtained from a 10% emulsifiable concentrate).

After the drying of the obtained coating, Spodoptera litoralis oro Heliothis virescens larvae L₃ were placed onto the cotton plants, and Colorada beetle larvae (Leptinotarsa decemlineata) onto the potato plants. The test was carried out at 24°C with 60% relative humidity.

The compounds according to Examples 1 and 2 exhibited in the above test a good insecticidal stomach poison action against Spodoptera litoralis, Heliothis and Leptinotarsa decemlineata larvae.

B. Systemic insecticidal action

In order to determine the systemic action, rooted bean plants (Vicia faba) were placed into a 0.01% aqueous activesubstance solution (obtained from a 10% emulsifiable concentrate). After a period of 24 hours, bean aphids (Aphis fabae) were placed onto the parts of the plants above the soil. The insects were protected by a special device from the effects of contact and of gas. The test was carried out at 24°C with 70% relative humidity.

In the above test, the compounds according to Examples 1 and 2 exhibited a systemic action against Aphis fabae.

EXAMPLE 4

Action against ticks

A. Rhipicephalus bursa

In each case, 5 adult ticks or 50 tick larvae were placed into a small glass test tube, and the test tubes then immersed for 1 to 2 minutes in 2 ml of an aqueous emulsion from a dilution series of 100, 10, 1 and 0.1 ppm of test substance. The tubes were then sealed with a standardised cotton plug, and inverted so that the active substance emulsion could be absorbed by the cotton wool.

An evaluation in the case of the adults was made after 2 weeks, and in the case of the larvae after 2 days. There were two repeats for each test.

B. Boophilus microplus (larvae)

With a dilution series analogous to that in Test A, tests were carried out with 20 sensitive larvae and OP-resistant larvae, respectively (resistance is with respect to diazinon compatibility).

Compounds according to Examples 1 and 2 were effective in these tests against adults and larvae of *Rhipicephalus bursa* and against sensitive and OP-resistant larvae, respectively, of *Boophilus microplus*.

EXAMPLE 5

Acaricidal action

Phaseolus vulgaris (plants) were infested, 12 hours before the test for acaricidal action, with an infested piece of leaf from a mass culture of *Tetranychus urticae*. The transferred mobile stages were sprayed with the emulsified test preparations from a chromotography-sprayer in a manner ensuring no running off of the spray liquor. An assessment was made after 2 to 7 days, by examination under a binocular, of the living and of the dead larvae, adults and eggs, and the results expressed in percentages. The treated plants were kept during the "holding time" in greenhouse compartments at 25°C.

The compounds according to Examples 1 and 2 were effective in the above test against adults, larvae and eggs of *Tetranychus urticae*.

EXAMPLE 6

Action against soil nematodes

In order to test the action against soil nematodes the active substances were added, in the concentration stated in each case, to soil infested with root-gallnematodes (*Meloidogyne arenaria*), and the whole intimately mixed. In the one test series, tomato seedlings were planted immediately afterwards in the thus prepared soil, and in the other test series tomatoes were planted after a waiting time of 8 days.

For an assessment of the nematicidal action, the galls present on the rootos were counted 28 days after planting and sowing, respectively.

Active substances according to Examples 1 and 2 exhibited in this test a good action against *Meloidogyne arenaria*.

EXAMPLE 7

Action against *Piricularia oryzae* on *Oryzae sativa*

After being sprayed with a 0.05% suspension of the active substance made up as a wettable powder, young rice plants were, after drying of the applied coating, infested with a spore suspension of the fungus *Piriarlaria orycae*. After 3 days' incubation time at 24°C and with high relative humidity, an evaluation was made of the disease infestation compared with that in the case of infested but untreated control specimens. Compounds according to Examples 1 and 2 were effective in this test against *Piricularia oryzae*.

EXAMPLE 8

Virucidal action against potato-virus Y (PVY) and cucumber mosaic virus (CMV)

Fifteen pepper plants (Capsicum annuum Var. "California Wonder") per test were cultivated in a controlled-atmosphere cupboard under well standardised conditions; and, after development of the cotyledons, transplanted to a greenhouse; they were sprayed three days later with an aqueous emulsion containing 2000 ppm of the substance to be tested and, after a further 24 hours, mechanically inoculated.

The systemic symptoms of the virus infection appeared after one week, so that it is possible to determine the antiviral activity of the tested substances.

Compounds according to Examples 1 and 2 exhibited an antiviral action against potato-virus Y and cucumber-mosaic virus on pepper plants.

What we claim is:

1. A compound of the formula $$R_1O\diagdown \underset{\underset{R_2S\diagup}{}}{\overset{O}{\underset{\|}{P}}}-N\underset{R_3}{\overset{\overset{O}{\|}}{\diagup}} \overset{}{C}-X-R_4$$

wherein
   $R_1$ represents $C_1$–$C_4$ alkyl,
   $R_2$ represents $C_1$–$C_7$ alkyl, $C_3$–$C_5$ alkenyl, $C_3$–$C_5$ alkenyl or benzyl,
   $R_3$ represents $C_1$–$C_6$ alkyl, allyl or $C_3$–$C_6$ cycloalkyl,
   $R_4$ represents $C_3$–$C_5$ alkenyl, $C_3$–$C_5$ alkynyl, benzyl, phenethyl, phenyl, naphthyl, or phenyl mono- or poly-substituted by methyl, methoxy, methylthio, methylsulphinyl, methylsulphonyl, trifluromethyl, fluorine, chlorine, bromine, ethyl, propyl, isopropyl, sec.butyl, $C_3$–$C_5$ alkenyl, nitro, propargyloxy, $C_1$–$C_4$ alkoxycarbonyl, cyano, sulphonamido or acetyl, and
   X represents oxygen or sulphur.

2. A compound according to claim 1, wherein
   $R_1$ represents methyl or ethyl,
   $R_2$ represents $C_1$–$C_5$ alkyl, allyl, propargyl or benzyl, and
   $R_3$ represents $C_1$–$C_3$ alkyl or allyl.

3. A compound according to claim 2, wherein
   $R_2$ represents n-propyl, isopropyl, n-butyl, sec.butyl, isobutyl, n-pentyl, propargyl, allyl or benzyl,
   $R_3$ represents methyl, n-propyl or allyl, and
   $R_4$ represents allyl, propargyl, benzyl, naphthyl, phenyl or phenyl mono- or polysubstituted by methyl, methoxy, methylthio, methylsulphinyl, methylsulphonyl, trifluoromethyl, fluorine, chlorine, bromine, ethyl, n-propyl, isopropyl, sec.butyl, nitro, propargyloxy, $C_3$–$C_5$ alkenyl, $C_1$–$C_4$ alkoxycarbonyl, cyano, sulphonamido or acetyl.

4. A compound according to claim 3, wherein,
   $R_1$ represents ethyl,
   $R_2$ represents n-propyl, sec.butyl, n-butyl, allyl, propargyl or benzyl,
   $R_3$ represents methyl or allyl, and
   $R_4$ represents allyl, propargyl, phenyl or phenyl mono- or poly-substituted by methyl, methoxy, methylsulphinyl, methylsulphonyl, trifluoromethyl, chlorine, bromine, ethyl, n-propyl, isopropyl, sec.-butyl, nitro, propargyloxy, methoxycarbonyl, cyano, allyl, sulphonamido or acetyl.

5. Compound according to claim 4 of the formula $$\underset{Cl}{\overset{Cl}{\underset{\bigcirc}{}}}-O-\underset{\underset{O}{\|}}{C}-N\underset{\underset{O}{\|}}{\overset{CH_3}{\diagup}}P\underset{OC_2H_5}{\overset{SC_3H_7(n)}{\diagup}}$$

6. Compound according to claim 3 of the formula $$\underset{Cl}{\overset{Cl}{\underset{\bigcirc}{}}}-O-\underset{\underset{}{\overset{O}{\|}}}{C}-N\underset{\underset{O}{\|}}{\overset{CH_3}{\diagup}}P\underset{OC_2H_5}{\overset{SC_3H_7(n)}{\diagup}}.$$

7. Compound according to claim 3 of the formula
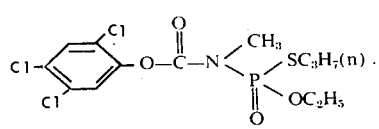
8. Compound according to claim 3 of the formula
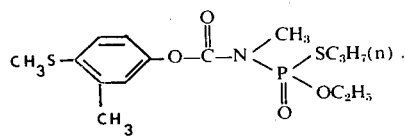
9. Compound according to claim 3 of the formula
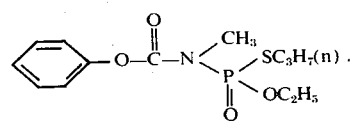
10. Compound according to claim 3 of the formula
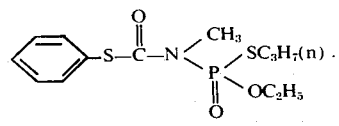
* * * * *

UNITED STATES PATENT OFFICE
CERTIFICATE OF CORRECTION

Patent No. 3,898,260   Dated August 5, 1975

Inventor(s) Willy Meyer, Beat Böhner & Dag Dawes

It is certified that error appears in the above-identified patent and that said Letters Patent are hereby corrected as shown below:

Claim 5, the formula should appear as shown below:

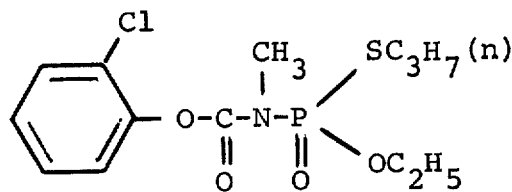

Signed and Sealed this

*thirtieth* Day of *September 1975*

[SEAL]

Attest:

RUTH C. MASON
*Attesting Officer*

C. MARSHALL DANN
*Commissioner of Patents and Trademarks*